United States Patent Office 2,785,054
Patented Mar. 12, 1957

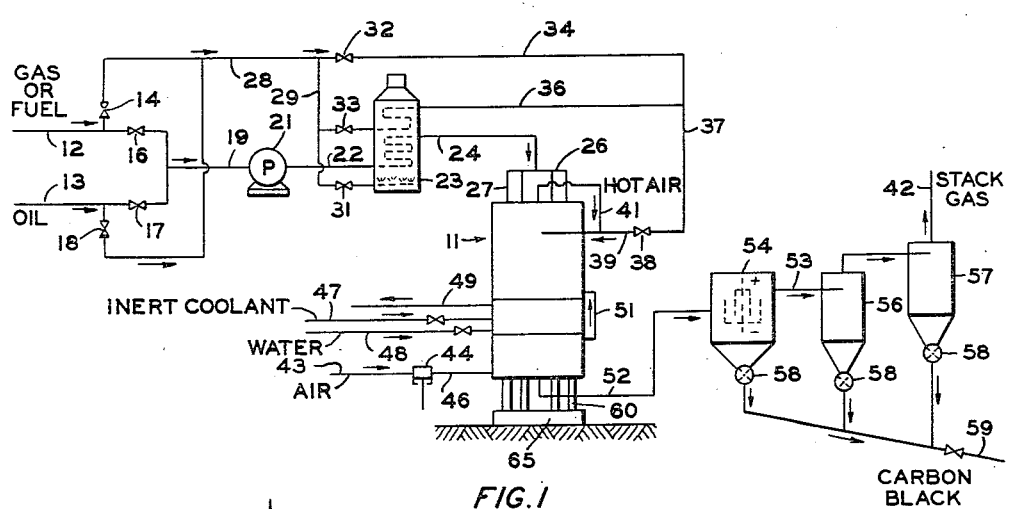
FIG.1
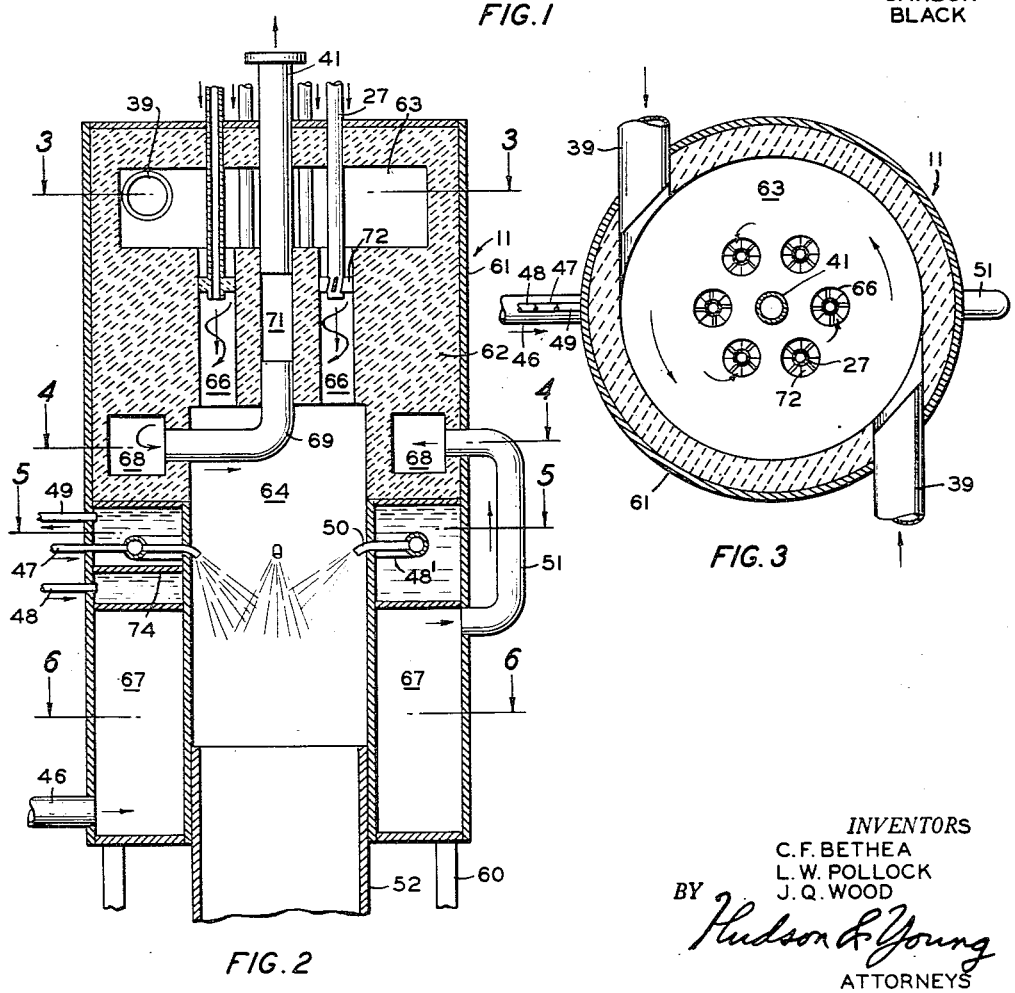
FIG.2
FIG.3
*INVENTORS*
C. F. BETHEA
L. W. POLLOCK
J. Q. WOOD
BY Hudson & Young
ATTORNEYS

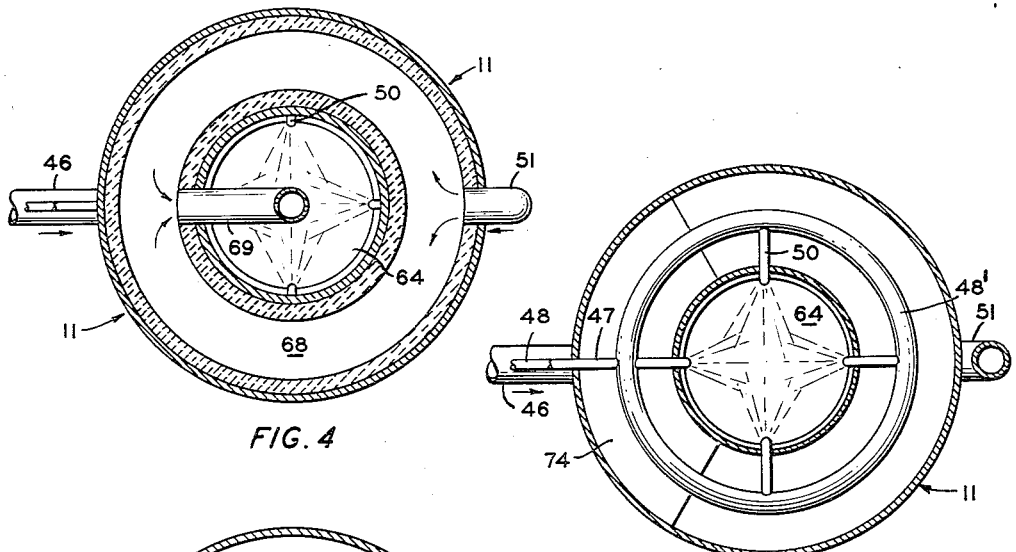
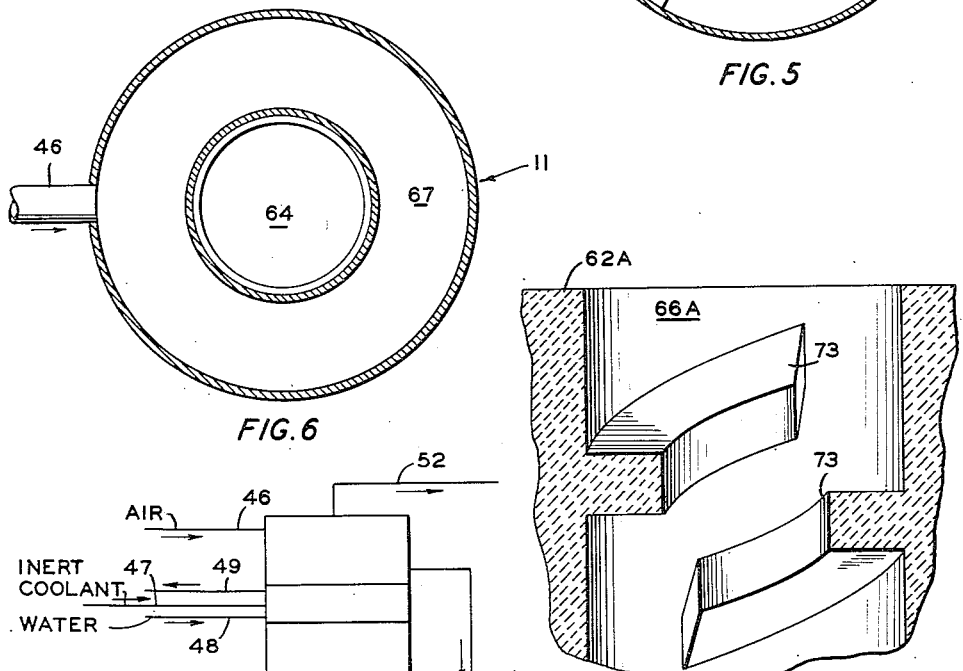
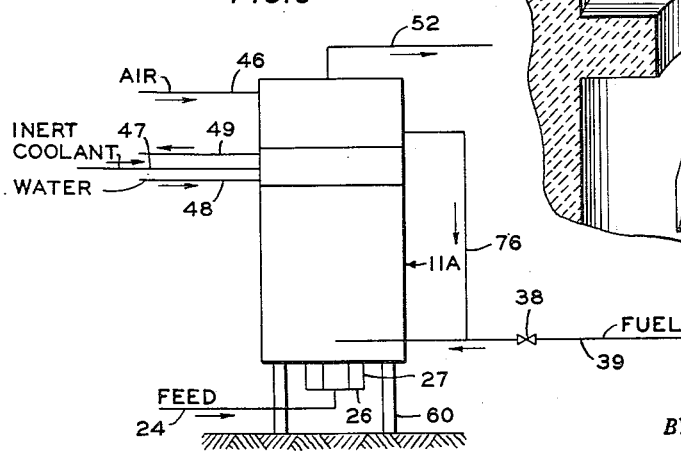

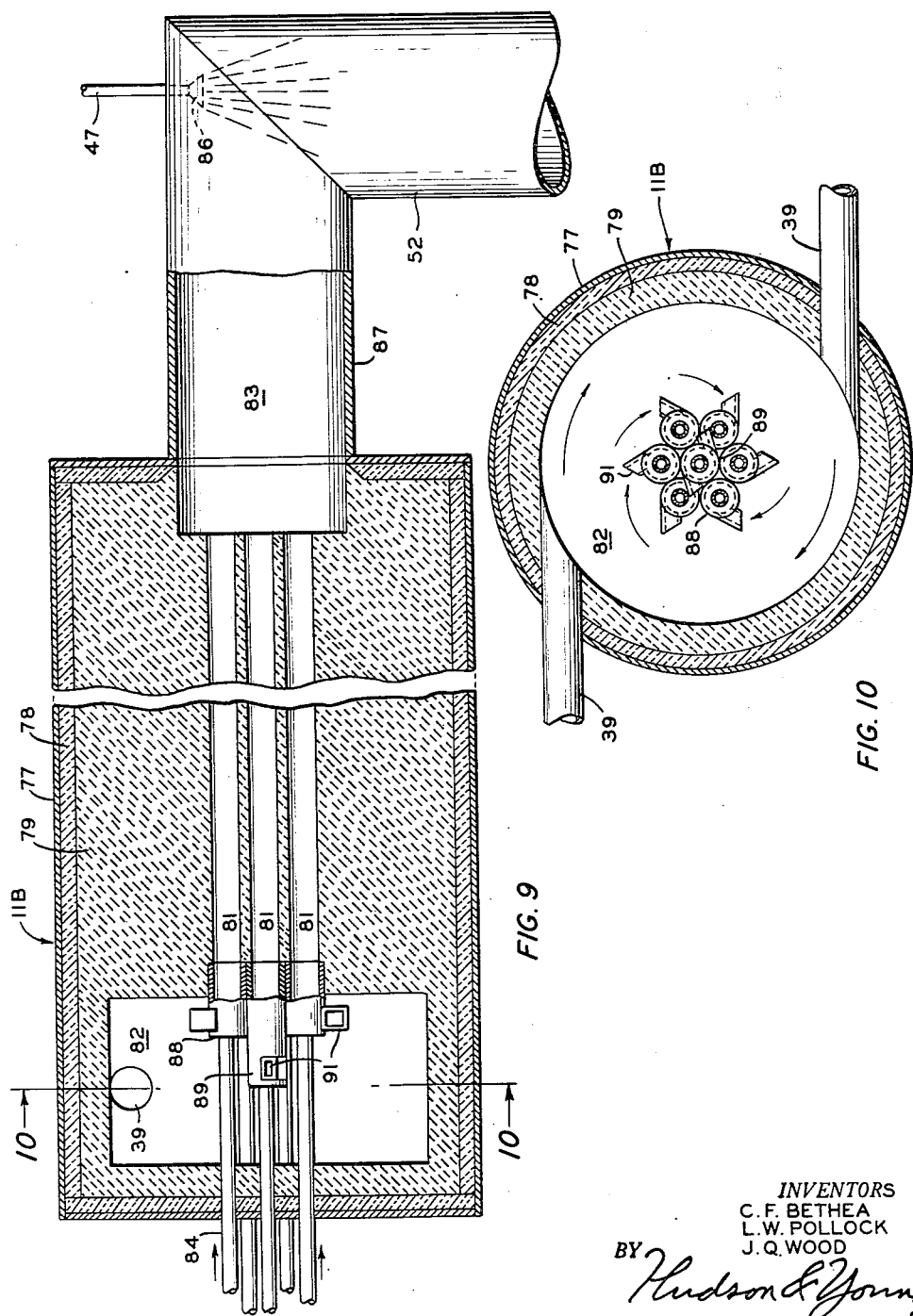

2,785,054

CARBON BLACK FURNACE AND PROCESS

Charles F. Bethea, Lyle W. Pollock, and James Q. Wood, Bartlesville, Okla., assignors to Phillips Petroleum Company, a corporation of Delaware Application January 2, 1952, Serial No. 264,477

12 Claims. (Cl. 23—209.4)

This invention relates to carbon black reactors of the furnace type in which hydrocarbons in the gaseous state are converted into carbon black by pyrolytic cracking, dehydrogenation and polymerization reactions in the presence of hot products of combustion. In one specific aspect it relates to a furnace having a plurality of closely nested reactor tubes. In another aspect it relates to a furnace having means for introducing combustion products from a common chamber helically into each of a plurality of tubes around the hydrocarbon in a fluid state which is introduced axially into said tubes. In another aspect this invention relates to carbon black making processes employing the apparatus of this invention. Other specific aspects relate to heating the feed materials to such a furnace. Other specific aspects relate to quenching the effluents from such a furnace.

In the art of making carbon black it has been found that certain types of carbon black will impart greater resistance to abrasion when mixed with rubbery materials, such as natural rubber or synthetic elastic polymerization products of butadiene, styrene and the like, such as that butadiene-styrene copolymer known by the designation GR–S. Regardless of the composition of the rubbery material, and independent of the other additives such as softeners, accelerators, antioxidants and the like, carbon blacks having a small average diameter grain size and therefore a large surface area impart better abrasion resistance than larger particles of carbon black. These carbon blacks which are valuable for high abrasion resistance they give to mixes, are known as HAF and SAF blacks, these being abbreviations for the expressions "high abrasion furnace" and "super-abrasion furnace" carbon blacks.

The present invention provides suitable apparatus for the formation of HAF and especially SAF carbon blacks.

In order to produce such superior carbon blacks it is necessary to preheat the reactant hydrocarbon feed until it is possible to introduce the same axially into the furnace in a gaseous state, or to spray the same into the furnace if not preheated, or not preheated sufficiently to vaporize more than about 80% of the liquid, and it is desirable to have a large body of hot combustion products available to surround and mix with the axial stream of gaseous hydrocarbons for a very short period of time followed by sudden quench to a point below the reaction temperature, although good quality carbon black in sufficient yield can be produced without the sudden quench.

The large diameter furnaces of the prior art are impractical in the production in economical operations of large quantities of carbon black of this high grade and small furnaces having a single axial tube are relatively expensive per unit output. These difficulties in the prior art are overcome in the present apparatus as will be apparent from the specification, claims and drawings.

One object of the present invention is to provide an improved carbon black reactor furnace. Another object is to provide such a furnace having multiple passages and embodying the advantages of both the small and large furnaces of the prior art in a furnace of a type unknown to the prior art. Another object is to provide an improved process of making carbon black employing the apparatus of this invention.

Other objects are to provide suitable means for heating the reactant hydrocarbon and free-oxygen containing gas entering the furnace, for quenching the carbon black, and for handling the effluent gases and separating the same from the carbon black and improved processes involving the same.

Other objects are to provide vertically disposed carbon black furnaces, and furnaces which are rugged in construction, easily repaired and maintained in operation, which are free from various difficulties encountered with the furnaces of the prior art, and improved processes involving the same.

Numerous other objects and advantages will be apparent to those skilled in the art upon reading the accompanying specification, drawings and appended claims.

In the drawings:

Figure 1 is an elevational diagrammatic view of a carbon black plant embodying the present invention.

Figure 2 is an enlarged cross-sectional view of the carbon black reactor furnace shown in Figure 1, showing details of construction.

Figures 3, 4, 5, and 6 are cross-sectional views of the apparatus shown in Figure 2, taken along the lines 3—3; 4—4; 5—5; and 6—6 respectively, looking in the direction indicated. Figure 3 is taken in the combustion zone of the furnace, Figure 4 is taken so as to show some of the air preheating, Figure 5 clearly shows the water-spray quench, and Figure 6 is taken to show the initial heating of the air.

Figure 7 is a cross-sectional view of a portion of a furnace having a modified form of reactor 2.

Figure 8 is an elevational view of a second form of furnace, differing from that shown in Figures 1 and 2 in that the furnace of Figure 8 is fired upwardly whereas that in Figures 1 and 2 is fired downwardly.

Figure 9 is an elevated view with parts broken away to show details of construction of a third form of furnace having horizontal tubes. This furnace also has a third means for passing combustion products as a helical blanket around the axially introduced hydrocarbon vapor.

Figure 10 is a cross-sectional view of the structure shown in Figure 9, taken along the line 10—10 looking in the direction indicated.

In Figure 1 is shown a carbon black reactor furnace generally designated as 11, which embodies the present invention, and in which the process of the present invention can be carried out. This furnace 11 is shown in more detail in Figures 2 to 6 inclusive. In Figure 1, furnace 11 is supplied with a reactant hydrocarbon feed, which may be gas 12 or oil 13. Because the normally liquid hydrocarbon feed which comprises substantial amounts of aromatic compounds will produce larger quantities of carbon black, it is preferred to use oil 13, although gas 12 could be employed as a feed. It is also necessary to have a supply of fuel and either gas 12 or oil 13 can be employed. Obviously, where gas is available and inexpensive, it is preferred to employ gas 12 as fuel, but wherever gas is scarce and expensive, it is then desirable to use oil 13; or some other hydrocarbon oil, which need not be the same oil as feed oil 13, can be employed as a fuel.

The selection of the fuel and feed is easily made by manipulating valves 14, 16, 17 and 18 in an obvious manner. For the preferred invention, oil 13 is used as feed, and therefore valve 18 is closed and 17 is open, so that oil 13 flows through pipe 19 and is pumped by pump 21 into line 22, is heated in heater 23 and passes through line 24 into manifold 26 from which it passes into individual feed inlet conduits 27 into furnace 11 as will be explained further below.

When gas 12 is selected as a fuel, valve 16 is closed and valve 14 is open, and the gas passes into lines 28 and 29. Some of the fuel in line 29 passes through valve 31 to provide fuel to heat heater 23. The remainder of the fuel in line 29 is passed through either or both of valves 32 and 33 and corresponding lines 34 and 36, depending upon the amount of preheating desired in heater 23. The fuel than passes through line 37 through valve 38 into line 39 along with heated free-oxygen containing gas from line 41 into furnace 11 as will be more fully described below. The free-oxygen containing gas in line 41 is preferably air because of its availability, but in some operations it is preferred to employ artificial free-oxygen containing gases in order to achieve certain results, such as to reduce the amount of nitrogen present in the stack gas 42 in case that is to be used for synthesis processes or the like. In the remainder of this specification, the free-oxygen containing gases will be referred to as air because this is a shorter expression; however, it should be understood that other such gases may be employed besides air. This air comes from a source of supply, such as the atmosphere, through pipe 43 and may be compressed by compressor 44 before passing through pipe 46 into furnace 11, where it passes in indirect heat exchange with the reaction and into pipe 41. An inert coolant passes through pipe 47 into the furnace, and this inert coolant is preferably water, but may be any other liquid or gaseous fluid provided it is inert when injected into a stream of hot effluents of the furnace. For example, stack gas 42 could be cooled and passed through pipe 47, or some other inert gas such as nitrogen could be employed. However, it is preferred to use water. Although good quality carbon black can be produced without quench 47, it is preferred to use water quench 47 because both quality and quantity of the carbon black produced is improved.

While not essential to the operation of the furnace, it has been found desirable to provide indirect heat exchange cooling with a coolant, again preferably water but any other fluid coolant in sufficient quantity could be used, this coolant (hereinafter called water) entering through pipe 48 and emerging from furnace 11 through pipe 49.

Pipe 51 is one means which may be chosen for passing air from pipe 46 to pipe 41 to the furnace 11. Obviously pipe 51 could be concealed inside the walls of furnace 11 if desired.

The effluent gases containing the carbon black produced in furnace 11 pass out through pipe 52 into a conventional solids and gas separator system, generally designated as 53. A number of such useful systems are known to the prior art, such as the various bag filters (not shown) and sonic separators (not shown) all of which are equivalent for the purposes of the present invention. In order to illustrate one form of this solid-gas separation, we have shown an electrical precipitator 54 in series with two cyclone separators 56 and 57, but another separation means can be employed. The gas is passed out of the system as stack gas 42 and the carbon black collected in the bottom of chambers 54, 56 and 57 passes through star valve 58 into collection line 59.

In Figure 2 the furnace 11 is shown in cross-section and in enlarged detail. It is preferred to have the furnace 11 have an exterior shell 61 of metal which may be supported on legs 60 carried on base 65 as shown in Figure 1. Returning to Figure 2, shell 61 contains a ceramic liner 62 formed to provide the first generally cylindrical chamber 63 and a second generally cylindrical chamber 64 connected by a plurality of generally cylindrical longitudinal passages 66. The fuel and free-oxygen containing gas in line 39 communicate with chamber 63 as shown, preferably entering the same tangentially to the inner wall of chamber 63, which is helpful in the conservation of rotational energy but which is not absolutely essential. It is essential, however, for feed inlet conduits to extend entirely through chamber 63 into passage 66 to discharge the feed axially therein as will be explained below.

Air from line 46 preferably enters annular chamber 67, passes through conduit 51 into an annular chamber 68 upstream of the point of entry of said inert coolant 47 and then passes through pipe 69 and conduit 71 into conduit 41 and out of furnace 11 to line 39 as shown in Figure 1. The inert coolant coming into pipe 47 may be distributed by an annular manifold 48' to emerge from cooling fluid injectors 50. The effluent gases from the furnace along with the inert fluid coolant 47 pass from chamber 64 into pipe 52 to the separation apparatus 53 shown in Figure 1. While not absolutely essential to the operation, it is preferred to provide means surrounding each of said feed inlet conduits 27 to impart helical movement to fluids passing from chamber 63 into each of passages 66. These means to impart helical movement may be helical fins 72 mounted on the exterior of pipe 27, or they may be helical fins formed as an integral part of the ceramic body 62A as shown in Figure 7, in which ceramic body 62A is otherwise the same as ceramic body 62 of Figure 2.

As shown in Figure 2, furnace 11 is a downdraft furnace. In other words, the furnace chambers 63, 66 and 64 are arranged vertically and gases flow from chamber 63 through chambers 66 and 64 into passage 52 in a downward direction. In Figure 8 the furnace is still vertical but the direction of flow is reversed and it is an updraft furnace with the flow vertical and in the opposite direction. In Figure 9 the furnace is a horizontal furnace and the flow is in a horizontal direction. As Figures 3 to 6 are simple cross-sections of Figure 2, it is not believed necessary to describe them further, the reference numerals being sufficient to indicate the corresponding parts. While Figures 2 and 4 show pipe 69 passing through chamber 64 directly below one of the passages 66, it is often preferable to slightly rotate the position of this pipe by thirty degrees so that it will come in between two of the passages 66 as much as possible.

The semi-annular separating plate 74 is best shown in Figure 5 and as shown in Figure 2, separating plate 74 causes the water entering through pipe 48 to be distributed somewhat before leaving through pipe 49.

Figure 7 merely illustrates how helical fins 73 may be formed integral with ceramic body 62A in the passage 66A. Parts 62A and 66A otherwise correspond to parts 62 and 66 respectively of Figure 2, and can be used in place of them in Figure 2.

As Figure 8 is merely the furnace of Figure 2 turned upside down, it is not believed necessary to describe the same except to state that the relative position of parts 48 and 49 is reversed so that the heated water will come out of the upper line because it is lighter. There is one other difference between Figures 8 and 2, and that is that in Figure 8 the chambers 68 and pipe 51 have been eliminated so that the air passes from pipe 46 into chambers 67 and from there directly through line 76 to join the fuel entering the furnace 11A through line 39. Legs 60 also extend directly to the ground without a base 65.

The furnaces shown in Figures 2 and 8 could, of course, be operated in a horizontal position, although this is not preferred because the inlet conduits 27, preferably made of ceramic material, might tend to sag in chamber 63. However it is possible to operate in a horizontal position as illustrated in Figure 9, and of course the furnace of Figure 9 could be operated in a vertical position as explained by Figures 2 and 8.

In Figure 9 the furnace 11B is preferably made with a steel shell 77 and an intermediate heat insulating layer 78, in order to reduce the expense, although these layers are not absolutely essential because the ceramic body 79 can be made without the outer layers. Ceramic body 79 contains a plurality of nested passages 81 leading from a first generally cylindrical chamber 82 into communication with a second generally cylindrical chamber 83. The fuel and air enter preferably tangential inlets 39 into the first cylindrical chamber and burns therein and the hydrocarbon feed coming from manifold 26 (not shown, but shown in Figure 1) is injected axially through each of passages 81 through a ceramic tube 84 which passes in indirect heat exchange with space 82. The effluent gases passing from chamber 82 through passage 81 into chamber 83 are quenched therein by a quench of inert fluid, such as water, coming through pipe 47 into a spray head 86, in a pipe 87 which is partially cooled by the atmosphere. As in the previous drawings, the effluent gas passes through pipe 52 to the separation means 53 shown in Figure 1.

Each of passages 81 is provided with a stack 88 communicating with each of said passages extending out into the chamber 82, stack 89 of the central passage 81 extending further out beyond the other stacks 88 in order to have access to chamber 82. Stacks 88 and 89 are provided with tangential entrance ports 91 as shown.

As Figure 10 is merely a cross-sectional view of Figure 9, no further explanation is needed aside from the reference numerals provided.

*Operation*

The hot products of combustion formed in chamber 63 of Figure 2 or in chamber 82 of Figure 9 pass through the passages 66 and 81 respectively, surrounding the axially moving hydrocarbon feed coming in through pipes 27 or 84 respectively. The short period of exposure of these hydrocarbon gases to the combustion products is terminated by cooling and then the carbon black is separated from the stack gas 42 as shown in Figure 1.

The same operation occurs in Figure 8, only the gaseous materials travel upwardly through the furnace 11A instead of downwardly as in furnace 11 of Figure 2.

By having a plurality of tubes 66 it is possible to have a large enough single combustion chamber to enable stable combustion therein and yet not have an excess of heat or of combustion products over that needed. While results of some value can be obtained without helical motion of the hot combustion products in the tubes, we have found that such helical motion results in such an increase in quality and quantity of the carbon black produced that such helical motion is always recommended. One feature of the present invention is to produce such helical motion in each individual tube by first establishing rotary motion of gases in the combustion zones 63, or 82, and then producing by fins 72 or vanes 91 helical movement in tubes 66 or 81 in the same rotational direction with conservation of rotary momentum.

When operating with a feed which is a normally liquid hydrocarbon comprising a substantial percentage of aromatic compounds, with a temperature above 2400° F. and a time of residence in the furnace of .035 to .040 second, a carbon black having an average particle diameter of less than 300 A. is produced. In all processes employing the present invention, the furnace carbon black is characterized by having a small average diameter particle size, and is adapted to impart good abrasion resistance to elastic mixtures, especially when the average particle diameter is below 500 A.

While the preferred process modification included preheating air 43 in space 67 alone, or in spaces 67 and 68, reheating the feed 22 in furnace 23 until at least 80% is vaporized, and preheating at least some of the fuel in furnace 23, any or all of these preheating steps may be omitted and the remaining process will still produce superior grades of carbon black in commercial quantities. When a preheating step is omitted the chamber in which the preheating would occur is merely bypassed in an obvious manner. Quench 47, 50, can also be omitted and still produce superior grades of carbon black in commercial quantities by shutting the valve shown in line 47. When feed 24 is not preheated and is liquid as it enters the furnace it is desirable to have the size of inlet tubes 27 enough smaller in diameter than manifold 26 to produce a spray of liquid feed in spaces 66, or to provide tubes 27 with orifices near their discharge ends as shown by Figure 7 of Ayers, U. S. Reissue Patent No. Re. 22,886 of June 3, 1947, when employing a liquid spray feed, or formed as an integral restriction in tube 27.

A dispersed hydrocarbon fluid is employed as feed from pipes 27 into chambers 66 which covers hydrocarbon gases, vapors, and sprays of liquid drops, but excludes streams of liquid hydrocarbon. "Fluid" covers both liquids and gases.

Certain specific embodiments are shown for purposes of illustration, but the invention is not limited thereto.

Having described our invention, we claim:

1. The process of making a furnace carbon black having a small average diameter particle size and adapted to impart good abrasion resistance to elastic mixtures, comprising the steps of preheating a hydrocarbon feed until at least 80% is gaseous, preheating a free-oxygen containing gas and fuel, burning said fuel in said free-oxygen containing gas to produce hot combustion gas in a first zone, passing said preheated feed in indirect heat exchange with said hot combustion gas in said first zone to indirectly heat said feed, passing said indirectly heated feed axially into a second zone, passing said hot combustion gas from said first zone into said second zone helically around said axially moving feed in direct heat exchange therewith, cooling the resulting carbon black containing effluent, and separating said carbon black from the resulting gases.

2. The process of claim 1 in which said preheating of said free-oxygen containing gas is at least partly by heat exchange with said effluent, and effects at least a portion of said cooling of said effluent.

3. The process of claim 1 in which said burning occurs in a unitary first zone but in which the feed is split into a plurality of streams, each preheated in said indirect heat exchange in said unitary first zone and each passed into a separate second zone in said direct heat exchange.

4. The process of claim 2 in which said burning occurs in a unitary first zone but in which the feed is split into a plurality of streams, each preheated in said indirect heat exchange in said unitary first zone and each passed into a separate second zone in said direct heat exchange.

5. The process of making a furnace carbon black having a small average diameter particle size and adapted to impart good abrasion resistance to elastic mixtures, comprising the steps of mixing a free-oxygen containing gas and fuel, burning said fuel in said free-oxygen containing gas to produce hot combustion gas in a first zone, passing a fluid hydrocarbon feed in indirect heat exchange with said hot combustion gas in said first zone to indirectly heat said feed, passing said indirectly heated feed in dispersed form axially into a second zone, passing said hot combustion gas from said first zone into said second zone helically around said axially moving feed in direct heat exchange therewith, cooling the resulting carbon black containing effluent, and separating said carbon black from the resulting gases.

6. The process of claim 5 in which said burning occurs in a unitary first zone but in which the feed is split into a plurality of streams, each preheated in said indirect heat exchange in said unitary first zone and each passed into a separate second zone in said direct heat exchange.

7. The process of making a furnace carbon black having a small average diameter particle size and adapted to impart good abrasion resistance to elastic mixtures, comprising the steps of mixing a free-oxygen containing gas and fuel, burning said fuel in said free-oxygen containing gas to produce hot combustion gas in a first zone, passing a liquid hydrocarbon feed in indirect heat exchange with said hot combustion gas in said first zone to indirectly heat said feed, spraying said indirectly heated feed in dispersed form axially into a second zone, passing said hot combustion gas from said first zone into said second zone helically around said axially moving feed in direct heat exchange therewith, cooling the resulting carbon black containing effluent, and separating said carbon black from the resulting gases.

8. The process of claim 1 in which the feed is a normally liquid hydrocarbon comprising a substantial percentage of aromatic compounds and the average diameter particle size of the carbon black produced is less than 300 Å.

9. A carbon black furnace comprising in combination a body having a ceramic lined heat insulated first generally cylindrical chamber, a second generally cylindrical chamber, a plurality of heat insulated generally cylindrical reaction conduits connecting said first and second chambers in communication, a fuel inlet conduit disposed to discharge fuel into said first chamber tangentially to the inner wall thereof, a plurality of feed inlet conduits for hydrocarbon to be decomposed to carbon black in said furnace, each feed inlet conduit passing through said first chamber axially into each of said reaction conduits respectively, a free-oxygen containing gas supply conduit disposed in indirect heat exchange relation with said second chamber and discharging into said fuel inlet conduit, a quench inlet conduit disposed to discharge a liquid quench spray into said second chamber, a water cooling jacket in indirect heat exchange with said second chamber, and means surrounding each of said feed inlet conduits to impart helical movement to fluids passing from said first chamber into each of said reaction conduits comprising helical fins on the feed inlet conduits in the annulus between them and the walls of said respective reaction conduits.

10. A carbon black furnace comprising in combination a body having a ceramic lined heat insulated first generally cylindrical chamber, a second generally cylindrical chamber, a plurality of heat insulated generally cylindrical reaction conduits connecting said first and second chambers in communication, a fuel inlet conduit disposed to discharge fuel into said first chamber, a plurality of feed inlet conduits for hydrocarbon to be decomposed to carbon black in said furnace, each feed inlet conduit passing through said first chamber axially into each of said reaction conduits respectively, and a free-oxygen containing gas supply conduit disposed in indirect heat exchange relation with said second chamber and discharging into said fuel inlet conduit.

11. A carbon black furnace comprising in combination a body having a ceramic lined heat insulated first generally cylindrical chamber, a second generally cylindrical chamber, a plurality of heat insulated generally cylindrical reaction conduits connecting said first and second chambers in communication, a fuel inlet conduit disposed to discharge fuel into said first chamber tangentially to the inner wall thereof, a plurality of feed inlet conduits for hydrocarbon to be decomposed to carbon black in said furnace, each feed inlet conduit passing through said first chamber axially into each of said reaction conduits respectively, and a free-oxygen containing gas supply conduit disposed in indirect heat exchange relation with said second chamber and discharging into said fuel inlet conduit.

12. A carbon black furnace comprising in combination a body having a ceramic lined heat insulated first generally cylindrical chamber, a second generally cylindrical chamber, a plurality of heat insulated generally cylindrical reaction conduits connecting said first and second chambers in communication, a fuel inlet conduit disposed to discharge fuel into said first chamber tangentially to the inner wall thereof, a plurality of feed inlet conduits for hydrocarbon to be decomposed to carbon black in said furnace, each feed inlet conduit passing through said first chamber axially into each of said reaction conduits respectively, a quench inlet conduit disposed to discharge a liquid quench spray into said second chamber, and means surrounding each of said feed inlet conduits to impart helical movement to fluids passing from said first chamber into each of said reaction conduits.

References Cited in the file of this patent

UNITED STATES PATENTS

| Re. 22,886 | Ayers | June 3, 1947 |
| 688,215 | Wegelin | Dec. 3, 1901 |
| 1,448,655 | Darrah | Mar. 13, 1923 |
| 1,987,643 | Spear et al. | Jan. 15, 1935 |
| 2,039,981 | Rembert | May 5, 1936 |
| 2,062,358 | Frolich | Dec. 1, 1936 |
| 2,114,738 | Heller et al. | Apr. 19, 1938 |
| 2,116,848 | Reed | May 10, 1938 |
| 2,418,475 | Loving | Apr. 8, 1947 |
| 2,419,565 | Krejci | Apr. 29, 1947 |
| 2,564,700 | Krejci | Aug. 21, 1951 |
| 2,623,811 | Williams | Dec. 30, 1952 |
| 2,659,663 | Heller | Nov. 17, 1953 |

FOREIGN PATENTS

| 611,221 | Germany | Mar. 25, 1935 |